United States Patent
Barthel et al.

(10) Patent No.: US 7,168,075 B1
(45) Date of Patent: Jan. 23, 2007

(54) AUTOMATION DEVICE AND UPDATING METHOD

(75) Inventors: Herbert Barthel, Herzogenaurach (DE); Jürgen Laforsch, Bühl (DE); Ralph Luber, Rastatt (DE); Josef Ritzer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 756 days.

(21) Appl. No.: 10/130,117

(22) PCT Filed: Nov. 14, 2000

(86) PCT No.: PCT/DE00/04002

§ 371 (c)(1),
(2), (4) Date: May 15, 2002

(87) PCT Pub. No.: WO01/37058

PCT Pub. Date: May 25, 2001

(30) Foreign Application Priority Data

Nov. 15, 1999 (DE) ................. 199 55 073
Nov. 23, 1999 (DE) ................. 199 56 271

(51) Int. Cl.
*G06F 9/46* (2006.01)
*G06F 13/24* (2006.01)
*G05B 9/02* (2006.01)

(52) U.S. Cl. .................... 718/103; 700/82; 710/260
(58) Field of Classification Search .............. 700/84, 700/82; 710/260; 718/102, 103; 714/11; 711/167; 713/502; 345/534
See application file for complete search history.

(56) References Cited

U.S. PATENT DOCUMENTS

| | | | | |
|---|---|---|---|---|
| 3,942,158 A * | 3/1976 | Dummermuth | ............... | 710/19 |
| 4,482,962 A * | 11/1984 | Amano et al. | ............... | 701/114 |
| 4,521,871 A * | 6/1985 | Galdun et al. | ................. | 714/11 |
| 4,658,351 A * | 4/1987 | Teng | ........................... | 718/103 |
| 5,168,566 A * | 12/1992 | Kuki et al. | ................ | 718/103 |
| 5,313,386 A * | 5/1994 | Cook et al. | .................... | 700/82 |
| 5,636,124 A * | 6/1997 | Rischar et al. | .............. | 700/100 |
| 5,742,824 A * | 4/1998 | Kosaka | ....................... | 718/106 |
| 5,933,347 A * | 8/1999 | Cook et al. | ................... | 700/82 |
| 6,560,628 B1 * | 5/2003 | Murata | ........................ | 718/103 |
| 2002/0082737 A1 * | 6/2002 | Amrhein et al. | ............ | 700/108 |
| 2004/0249476 A1 * | 12/2004 | Patz et al. | ..................... | 700/14 |
| 2006/0195847 A1 * | 8/2006 | Amano et al. | .............. | 718/103 |

FOREIGN PATENT DOCUMENTS

| | | |
|---|---|---|
| DE | 196 24 302 | 1/1998 |
| EP | 460 308 | 12/1991 |
| EP | 460308 A1 * | 12/1991 |
| EP | 497 147 | 8/1992 |
| EP | 636 956 | 2/1995 |

\* cited by examiner

*Primary Examiner*—Anthony Knight
*Assistant Examiner*—Jennifer L. Norton
(74) *Attorney, Agent, or Firm*—Staas & Halsey LLP

(57) ABSTRACT

A device used for control or monitoring of a process is updated without interruption or exceeding upper response time limits for response to a change in the state of the process. If the updating task requires too much run time, the updating task is terminated. As soon as the updating task has been terminated, a configuration is established again with regard to the control or monitoring of the process, so that it is possible to respond again to changes in the state of the process.

4 Claims, 4 Drawing Sheets

AUTOMATION DEVICE AND UPDATING METHOD

CROSS REFERENCE TO RELATED APPLICATIONS

This application is based on and hereby claims priority to German Application No. 19956271.7 filed on Nov. 23, 1999 and German Application No. 19955073.5, filed on Nov. 15, 1999 the contents of which are hereby incorporated by reference.

BACKGROUND OF THE INVENTION

1. Field of the Invention

The invention relates to a programmable controller for controlling and/or monitoring a technical process, including a memory for storing at least one user program including at least one task and process- and user-program-related data, and when a redundant programmable controller is connected, the content of the memory is transferred into a memory of the redundant programmable controller. It also relates to a method for updating a redundant programmable controller, communicatively connected to such a programmable controller.

2. Description of the Related Art

A widely used special implementation of a programmable controller suitable for single operation and thus for non-redundant operation is a stored-program controller (SPC). A so-called process computer or also a so-called personal computer which, in comparison with a personal computer provided for pure office use, is supplemented, in particular, by a special power supply, by special shielding, by a buffered memory and/or by an uninterruptible power supply, can also be used as programmable controller.

In principle, the programmable controller, like any "standard computer", comprises at least one processor for executing a user program stored in a memory. In comparison with a standard computer, the special feature of the programmable controller is that the programmable controller Is capable of linking to a process to be controlled and/or to be monitored, particularly input/output devices such as, e.g. digital/analog input interfaces and digital/analog output interfaces.

A programmable controller which, in contrast to the programmable controller provided for single operation, is suitable for redundant operation with at least one redundant programmable controller—also called back-up programmable controller in the text which follows—is distinguished from the former at least by a device for communicative connection to the associated redundant programmable controller. Such a device is usually an interface, e.g. a serial/parallel interface or a bus interface which makes it possible to establish a communication link to the associated redundant programmable controller. Such programmable controllers suitable for redundant operation are known, e.g. from EP 0 497 147, EP 0 636 956 or DE 196 24 302.

From EP 0 497 147, a programmable controller constructed redundantly of two part-devices is known. Each of the part-devices exhibits a central processing unit and a memory and a communication processor, the two communication processors being connected to one another via a communication line. The two part-devices execute identical user programs and exchange synchronization data via the communication line for ensuring synchronous processing of the identical user programs.

From EP 0 636 956, a programmable control system is also known which exhibits two subsystems, namely an initial programmable control system and an additional programmable control system. When one of the subsystems fails, the technical process is conducted by the remaining subsystem, the initial programmable control system. After the failed subsystem has been replaced, this system, namely the additional programmable control system, must be coupled to the initial programmable control system again. For this purpose, both the initial programmable control system and the additional programmable control system have a communication interface by which the two subsystems can be communicatively connected. The content of the memory of the initial programmable control system is transferred via this communication connection into the memory of the additional programmable control system. This transfer takes place either during a noncritical state of the initial programmable control system with respect to time or progressively in so-called time slices, the control of the technical process being retained by the initial programmable control system.

The transfer of the content of the memory of the first device/subsystem into the memory of the redundant second device/subsystem is also called "updating". Thus, a method for updating (updating method) is known from DE 196 24 302, by which the current database of the initial programmable control system is transferred to an additional programmable control system temporarily shut down, e.g. due to maintenance work.

The known updating method is subdivided into two passes. In a first pass, the content of the memory of the initial programmable control system is transferred by progressive read-out from the memory of the initial programmable control system and writing into the memory of the additional programmable control system. The volume of the data read out and written in, in one step during this process, is determined by the time interval needed for this process and the maximum tolerable latency phase of the initial programmable control system with respect to the process to be controlled. After a certain number of such write and read processes, a "basic database" of the initial programmable control system has been transferred to the additional programmable control system. During this time, however, the data in the memory of the initial programmable control system are subject to continuous change due to the uninterrupted control of the technical process. These memory contents, which have changed in the meantime, are transferred in a further pass. For this purpose when new and/or changed data are written into the memory of the initial programmable control system, the same data, together with position information, are also written into a buffer and in a second pass, the content of the buffer is transferred into the memory of the additional programmable control system with evaluation of the position information.

SUMMARY OF THE INVENTION

The invention is based on the object of specifying a programmable controller which is suitable for redundant operation and by which updating of a redundant programmable controller or back-up programmable controller is made possible in a particularly efficient manner and without noticeable disturbance of the continued control of the technical process and without additional hardware expenditure. Furthermore, a particularly suitable method for updating a redundant programmable controller communicatively connected to such a programmable controller is to be specified.

The advantages achieved by the invention, in particular, are that, on the one hand, the control and/or monitoring of the technical process does not need to be interrupted for updating and that, on the other hand, upper response time limits, i.e. time intervals within which the system responds to a change in the state of the process, are maintained even during the continued control and/or monitoring of the technical process, in that an updating task is terminated which, together with the task of the user program associated with it, requires too much run time. As soon as the updating task has been terminated, the configuration or operational state which would exist without the requirement of updating is established again with regard to the control and/or monitoring of the technical process, so that it is possible to respond again to changes in the state of the technical process in accordance with the capabilities of the user program.

The user program of the programmable controller stored in the memory and executed by a processor comprises at least one so-called task, i.e. a run unit of the user program, the progress (order, duration) of which is determined by the so-called scheduler of the operating system. In addition to the user program, process- and user-program-related data, e.g. process states and variables of the user program are also stored in the memory of the programmable controller.

When the back-up programmable controller is connected, e.g. after termination of the maintenance work on the back-up programmable controller, a transfer of the content of the memory of the programmable controller into the memory of the back-up programmable controller is provided (updating). This transfer takes place during the operation of the programmable controller, that is to say during the uninterrupted control of the technical process by the programmable controller.

The updating method is subdivided into two passes. In a first pass, the content of the memory of the programmable controller is transferred into the memory of the back-up programmable controller by progressive read-out and writing-in—analogously to the updating method known from DE 196 24 302. The volume of the data read out and written in, respectively, in one step is determined by the time scale needed for this procedure and the maximum tolerable latency phase of the programmable controller with respect to the process to be controlled. After a certain number of such writing and reading processes, a "basic database" of the programmable controller has been transferred to the back-up programmable controller. During this time, however, the data in the memory of the programmable controller are subject to continuous change due to the uninterrupted control of the technical process. These memory contents, which have changed in the meantime, are transferred in a further updating pass.

The further updating is done by special updating tasks which is allocated to each task of the user program for transferring the content of the part of the memory which is accessed by the respective task, and it can also be provided that one updating task is allocated to a number of tasks of the user program. The respective updating task is executed following the execution of the task to which the updating task is allocated. The sum of the run time of task and allocated updating task is, out of necessity, greater than the run time of the task itself.

To be able to perform the updating without noticeable disturbance to the continued control of the technical process, the progress of an updating task must only delay the start of other tasks of the user program marginally, if at all, as is known. To ensure this, the sum of the run times of task and allocated updating task is determined and registered as aggregate run time. If the registered aggregate run time exceeds a predetermined or predeterminable upper run time limit, the execution of the updating task is ended by terminating the updating task.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
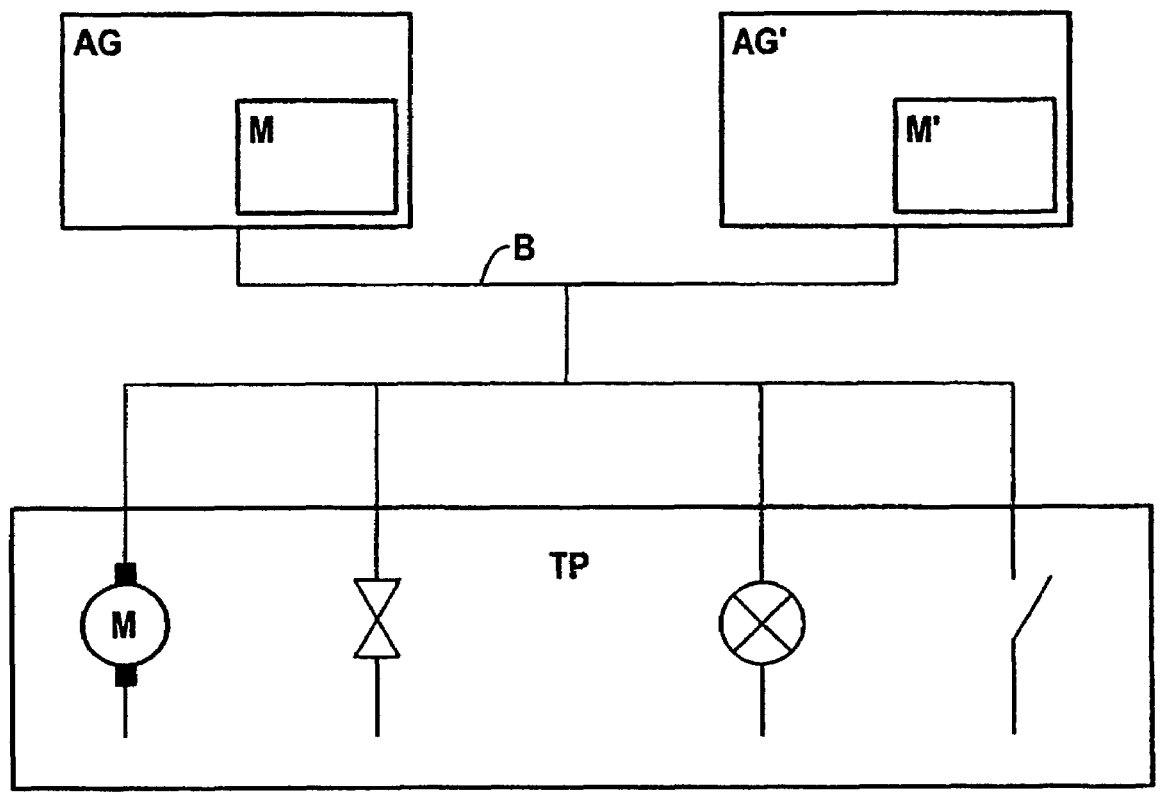
FIG. 1 is a block diagram of a programmable control system with a programmable controller and a redundant programmable controller, communicatively connected thereto, for guiding a technical process.

Reference will now be made in detail to the preferred embodiments of the present invention, examples of which are illustrated in the accompanying drawings, wherein like reference numerals refer to like elements throughout.

FIG. 1 shows a programmable control system AG, AG' and a technical process TP to be controlled and/or to be monitored by the system. The programmable control system AG, AG' comprises at least one programmable controller AG and a redundant programmable controller or back-up programmable controller AG'.

Both the programmable controller AG and the back-up programmable controller AG' are capable of guiding the technical process TP. The distinction between the programmable controller AG and back-up programmable controller AG' must be considered to be a purely linguistic distinction which describes the respective functions of the device AG, AG'. Thus, the back-up programmable controller AG' of a first updating process can be the programmable controller AG of a further updating process occurring later in time.

To transmit commands and control instructions to the technical process TP but also to receive signals and process values from this process, a communicative connection B is provided between the programmable controllers AG, AG' and the technical process TP. By way of an example, this communicative connection B is shown as the bus connection B in FIG. 1. The communicative connection B for the process TP can also be provided wholly or partially in the form of a conventional wire link.

Similarly for reasons of simplifying the drawing only, the communicative connection B which enables the process to be connected also represents the communicative connection between programmable controller AG and back-up programmable controller AG'. Bus connections B used today normally have such capacity that they provide sufficient bandwidth for handling both the internal communication (programmable controller AG, back-up programmable controller AG') and the external communication ((back-up) programmable controller AG, AG', technical process TP).

However, it is also possible to handle the internal communication via a separate bus—for example a so-called back panel bus in order to achieve particularly high data transfer rates, if necessary, in this manner so that the updating can be done in an accelerated manner overall.

Furthermore, each programmable controller AG, AG' has a memory M, M' which is provided for storing at least one user program with at least one task T1, T2 and process- and user-program-related data.

In the text which follows, it is assumed that the tasks T1, T2 of the user program are so-called cyclic tasks T1, T2 which are in each case executed in a fixed timing pattern, e.g. every 300 ms. A cyclic task T1, T2 is only executed regularly every 300 ms if the run time of the task T1, T2 itself is not more than 300 ms and no other task T1, T2 is executed at the time at which this cyclic task T1, T2 would have to be started again.

The first condition is met with the programming of the user program in that for a task T1, T2, which runs in a fixed timing pattern of e.g. 300 ms, no tasks are provided whose processing takes more than 300 ms run time to complete.

The second condition is met only indirectly during the programming especially since—as already mentioned above—the scheduler essentially takes over the task management. However, the programming or the program with its considered assignment of priorities which are a measure of the order of priority in the execution of competing tasks T1, T2 for the scheduler, form the basis for an execution of the respective task T1, T2 actually being possible within the intended timing pattern.

By way of example, the case is described here in which a run time-intensive input task is assigned a higher priority than an important cyclic alarm task and the alarm task, therefore, cannot be called up within its timing pattern. Although the call times of the alarm task are reached time and again, the alarm task, due to its lower priority, is not executed while the input task with the higher priority is being executed.

Figure 2:
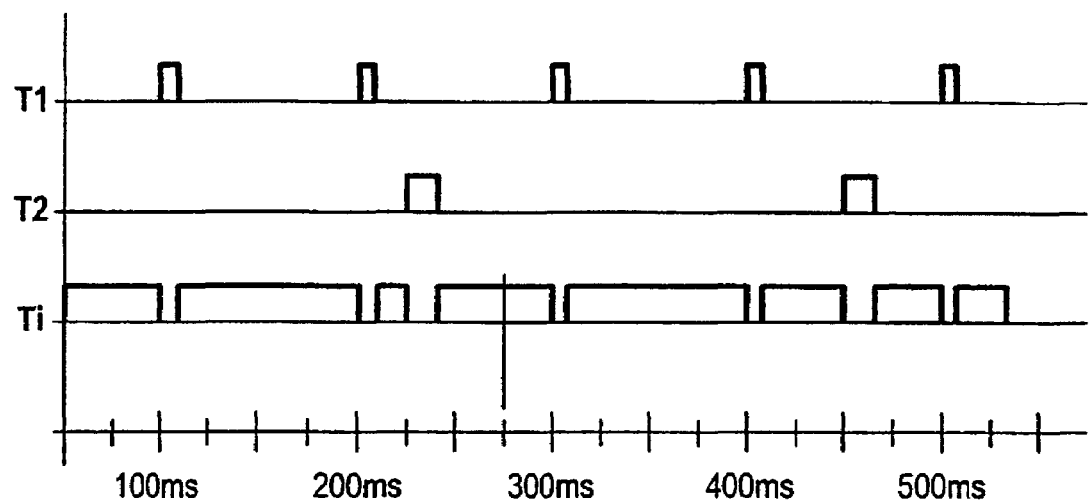
FIGS. 2 to 5 are graphs of the progress in time of various tasks with in each case different priorities of a user program.

FIG. 2 shows the variation with time of the processing of a cyclic (user) program T1 with two tasks T1, T2. The tasks T1, T2 run within a fixed timing pattern, task T1 being executed every 100 ms and task T2 being executed every 225 ms. The cyclic program Ti, too, can be considered as a task, e.g. as a task without fixed timing pattern. The cyclic nature of the program Ti is indicated graphically in FIG. 2 by the "restart" of the program T1 at time t+275 ms.

To ensure that a task T1, T2, which is provided for running within a fixed timing pattern, is actually started in each case at the starting times predetermined by the timing pattern, priorities can be assigned to the tasks T1, T2 and a higher priority of a task results in it being processed preferentially by the processor. The tasks are coordinated by the scheduler of the operating system.

Without an assignment of priorities, a task Ti, once started, would be executed permanently—but at least until it reaches its end—with regard to the situation shown in FIG. 2. Other tasks T1, T2 would not be executed if they were not called up directly by the task Ti permanently executed. Using such a direct call of a task T1, T2 from another task Ti permanently executed, however, a fixed timing pattern cannot be implemented, or only with difficulty, for executing the tasks T1, T2 unless the task Ti itself provides the full functions of a scheduler.

The scheduler contained in the operating system simplifies the coordination in the progress of tasks T1, T2, Ti. For this purpose, the scheduler is informed of each task T1, T2, Ti and for each task T1, T2, Ti parameters are defined which establish the type, duration and order of their progress.

For the situation shown in FIG. 2, it is established for the tasks T1, T2 that these are cyclic tasks T1, T2, task T1 to be called up every 100 ms and task T2 to be called up every 225 ms. In addition, a higher priority is assigned to task T1 than to task T2. In FIG. 2 this is graphically represented by the position above the ordinate. Task Ti is a cyclic task without fixed timing pattern. It is restarted every time it reaches its end. Task Ti has the lowest priority.

If one of the times is reached at which one of the tasks T1, T2 is to be executed—e.g. t+100 ms, t+200 ms, t+225 ms, t+300 ms, t+400 ms, t+450 ms, t+500 ms, . . . , the scheduler interrupts the execution of task Ti and ensures that the respective task T1, T2 is executed.

At time t+900 ms, both task T1–100 ms pattern—and task T2–225 ms pattern—would have to be executed at the same time according to the selected example. This is not possible since the processor cannot execute the instructions of the first task T1 at the same time as the instructions of the second task T2. Since task T1 has been assigned a higher priority than task T2, task T1 with the higher priority is first executed at this time and at comparable times, followed immediately by task T2. The processor switches back to task Ti after task T2 has also been ended.

This configuration shows that even in the case where a task T1, T2 is intended to be executed within a fixed timing pattern, its actual progress within the intended timing pattern cannot be ensured in every case as a result of system conditions. For this reason, a shift in the starting times of individual tasks T1, T2 can be tolerated within certain limits.

Figure 3:
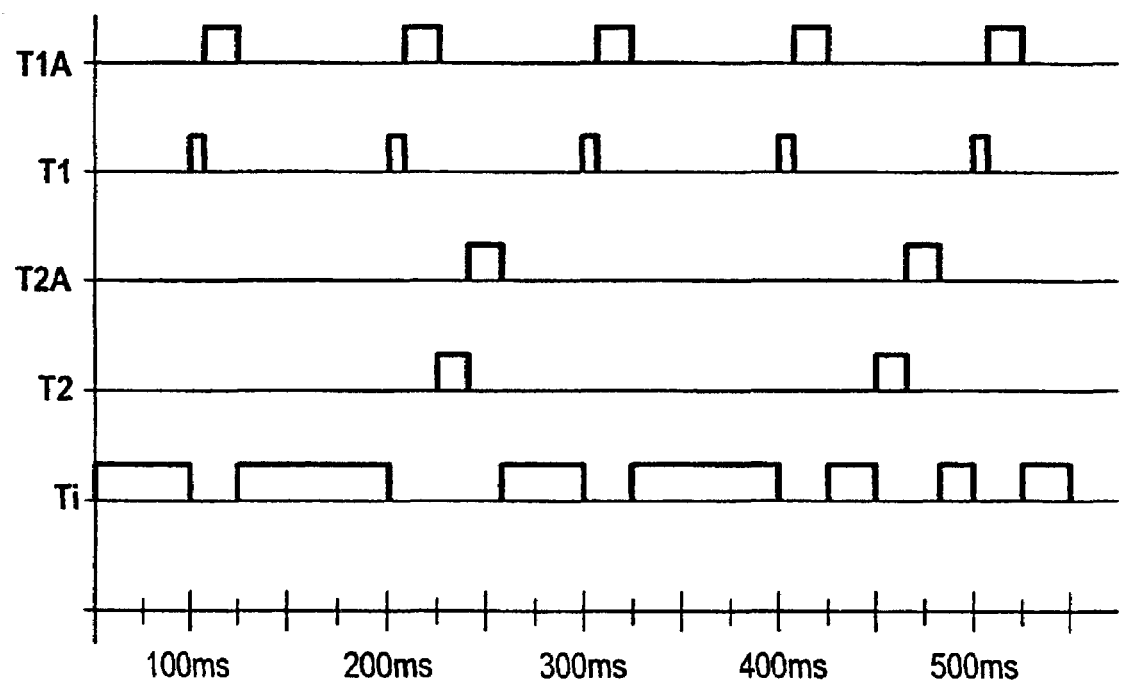

FIG. 3 illustrates the way in which the updating tasks T1A, T2A allocated to tasks T1, T2 are executed, i.e. at which times. Tasks T1, T2 according to FIG. 2 are shown again. In addition, the updating task T1A allocated to task T1 and the updating task T2A allocated to task T2 are shown. To simplify matters, tasks T1, T2, T1A, T2A should in each case have the same run times at every call time shown. However, the run times of tasks T1, T2, T1A, T2A can also differ from call time to call time.

The updating task T1A allocated to task T1 has a higher priority than task T1 itself. This ensures that the updating task T1A is executed immediately following the execution of task T1, if possible. This analogously applies to the updating task T2A allocated to task T2.

FIG. 3 shows that for the selected section of the time axis, a configuration happens to exist in which the run times of tasks T1, T1A, T2, T2A do not interfere with the execution of the cyclic tasks T1, T2 at their respective starting times—every 100 ms and every 225 ms, respectively. The time needed for executing the updating tasks T1A, T2A is used completely "at the expense" of task Ti. This can be seen from the fact that the time for restarting task Ti has been shifted from time t+275 ms to time t+525 ms in contrast to FIG. 2. This extension of individual cycles of the user program is not considered to be critical since its cycle time is not very often constant, in any case, and differs in accordance with the run time required in any case for the individual tasks T1, T2.

A "critical" situation only occurs when the execution of an updating task T1A calls into question the start of a cyclic task T2, running within a fixed timing pattern, at its predetermined starting time. Such a configuration is shown in FIG. 4.

Figure 4:
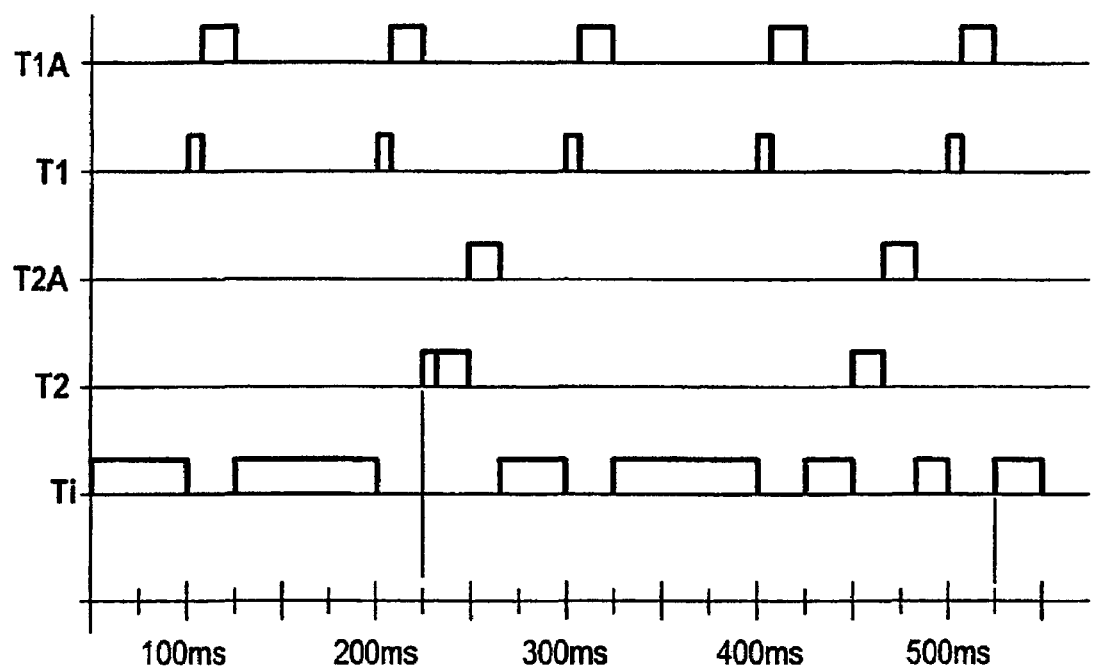

Compared with FIG. 3, the run time of the updating task T1A at time t+200 ms is slightly longer in FIG. 4. As a result, the updating task T1A is still executed at time t+225 ms, i.e.

at the time at which task T2 should actually be started. Since the updating task T1A has a higher priority than task T2, the updating task T1A is not interrupted even though the starting time of task T2 has been reached. Task T2 is only executed when the execution of the updating task T1A has been terminated. This results in a configuration in which, due to the execution of the updating task T1A, task T2 can no longer be executed within the fixed timing pattern actually provided.

As already mentioned, a configuration in which a fixed timing pattern cannot be adhered to precisely can also occur in the absence of the updating tasks T1A, T2A. Slight shifts in the call times of the cyclic tasks T1, T2 can, therefore, always be tolerated and are frequently not noticed. It is not possible to determine in advance what shifts in the call times of the individual cyclic tasks T1, T2 can be tolerated in the individual case. Instead, the magnitude of the shifts which can be tolerated at a maximum according to the required time sequence in calling up the individual tasks T1, T2 and particularly with respect to the requirements of the technical process TP to be controlled and/or to be monitored must be established during the development of the program for controlling and/or monitoring the respective technical process TP.

A shift of a call time of a cyclic task by some 100 ms can be quite tolerable in a slow process which is controlled by a program having few tasks which are largely uncritical with respect to time but can have disadvantageous consequences in a fast time-critical process. Thus, the maximum run times t1I, t2I are specified, the upper limit for the sum of the run time of task T1, T2 and associated updating task T1A, T2A.

From a programming point of view, this is an operating step which, in principle, is no different from establishing the call times—the timing pattern—of the cyclic tasks T1, T2 or their priorities which also essentially must be tailored to the situation of the respective technical process TP and thus can also not be specified in advance. The maximum run time t1I could thus be set for the value 50 ms. In the configuration according to FIG. 4, this maximum run time t1I is not reached. Accordingly, the updating task T1A would not be terminated. As long as no updating task T1A, T2A is interrupted during an updating process, the updating process as a whole is also continued.

Figure 5:
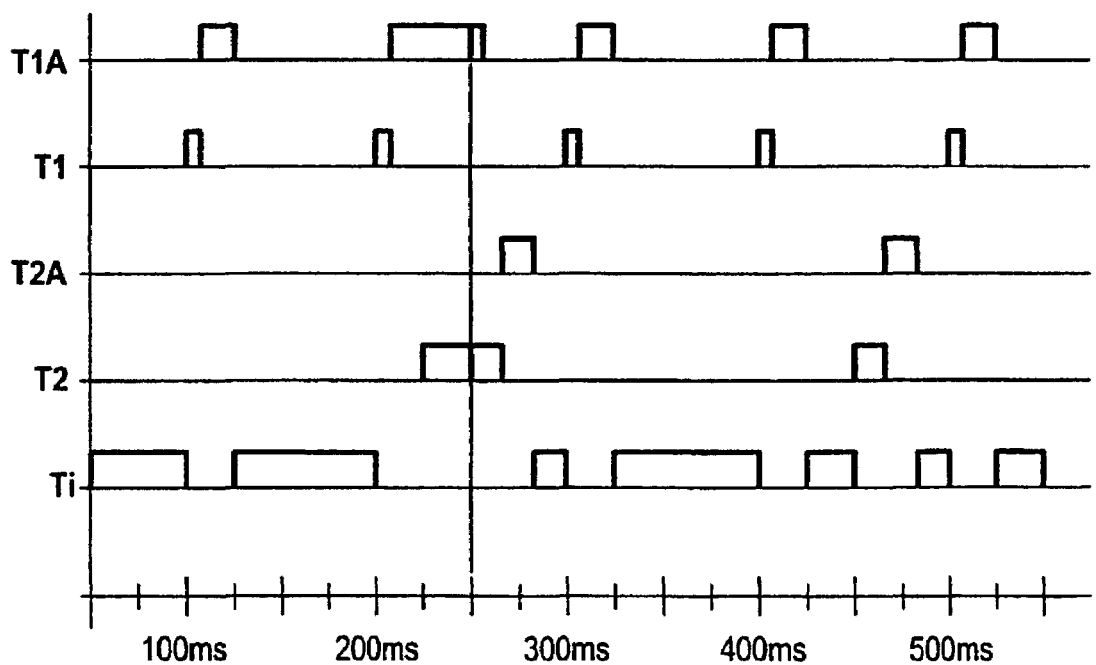

FIG. 5 shows a configuration in which the aggregate run time tI, i.e. the sum of the run times of task T1 and of the associated updating task T1A would exceed the specified maximum run time t1I of, e.g. 50 ms. In this configuration, the execution of the updating task T1A is interrupted by terminating the updating task T1A.

The maximum run times t1I, t2I are monitored, e.g. by a monitoring task with correspondingly high priority, which is provided for this purpose. It runs within a timing pattern which is so narrow that it is possible to monitor the aggregate run times t1, t2 and detect when the maximum run times t1I, t2I are exceeded.

Terminating the updating task T1A ensures that the execution of the cyclic task T2 is not unacceptably delayed. With the termination of the updating task T1A, the "waiting" task T2 becomes the run-time task having the highest priority at present. It is, therefore, immediately provided for execution by the scheduler. Thus, certain response times can be maintained or ensured even during the updating, i.e. times in which it is possible to respond to certain changes in the technical process TP, e.g. the changes of a measurement value influencing a regulating process.

If an updating task T1A, T2A is terminated during the second pass—that is to say during the section of the updating in which the memory content is transferred by the updating tasks T1A, T2A—due to the upper limit of the run time t1I, t2I having been exceeded, the second pass is terminated as a whole and restarted—possibly after a predetermined or predeterminable "relaxation time" of, e.g. one minute has elapsed.

The updating is only considered to be successfully concluded as a whole if during the second pass, all updating tasks T1A, T2A are processed without exceeding the upper run time limit t1I, t2I, that is to say terminate themselves by reaching their program end and the content of a special memory area which is accessed by the user program during the updating is transferred in a concluding step.

Now the back-up programmable controller AG' is updated by first progressively reading out the content of the memory M of the programmable controller AG and transferring to the back-up programmable controller AG' by writing it into its memory M'. The first pass of the updating process is shown in FIG. 6.

Figure 6:
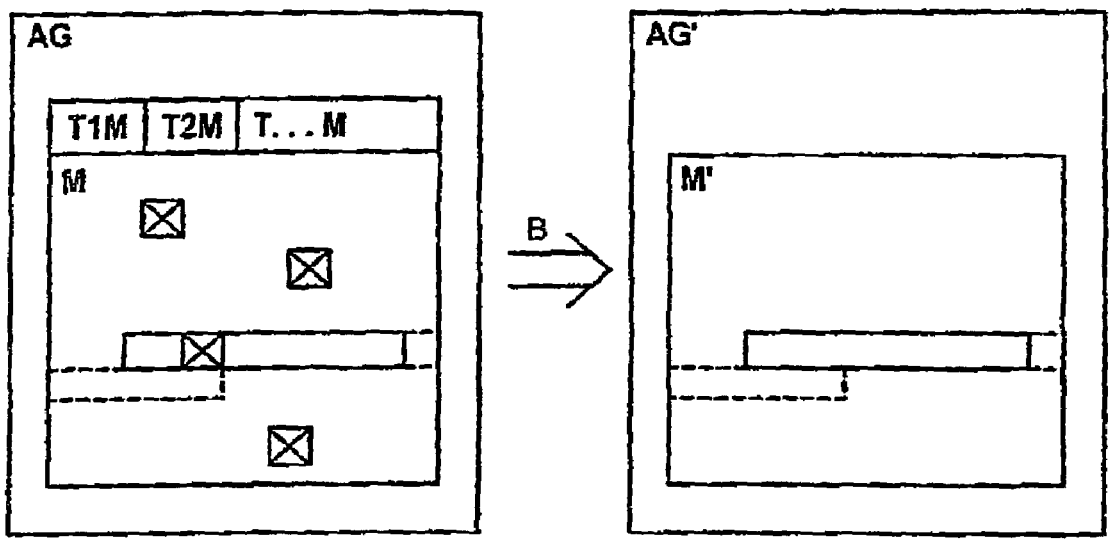
FIG. 6 is a block diagram of the transfer of the content of individual segments of a memory of the programmable controller into a corresponding memory of the redundant programmable controller.

According to FIG. 6, the content of the memory M is progressively read out and transferred into the memory M' of the back-up programmable controller AG'. This is indicated by the section of the memory M bordered by dashed or continuous lines. The transfer takes place via the communicative connection B provided between the programmable controller AG and the back-up programmable controller AG', e.g. a bus. This is indicated by an arrow in FIG. 6.

With this step, a "basic database" is transferred to the back-up programmable controller AG'. This basic database comprises, e.g. the user program running on the programmable controller AG and the so-called peripheral or process map of the technical process TP and also possibly certain data not subject to continuous changes (e.g. operating parameters, recipe data etc.) of the user program.

Since the guidance of the technical process TP by the programmable controller AG is maintained unchanged during the updating—that is to say also during the transfer of the "basic database", continuous changes are taking place in the content of the memory M. These changes in the memory M are shown by the crossed-out areas in the memory M in FIG. 6.

During the transfer of the "basic database", all changes which have occurred "before" the section which is currently being read out and transferred, are taken into consideration since the section in which these changes have occurred is read out and completely transferred just like all previous sections. In FIG. 6, this is an area which is located in front of the area currently transferred. The other three changed areas shown in FIG. 6 could not be taken into consideration during the transfer of the basic database since the corresponding changes only became effective after the contents of the relevant sections had been transferred. Repeating the transfer of the basic database several times in the manner described does not bring a better result since the changes in the memory M are continuous but not deterministic.

As a supplementary updating run which is capable of taking into consideration also changes in the content of the memory M to be transferred which took place during the updating, a pass is now started with an updating task T1A, T2A allocated to each task T1, T2 of the user program.

Figure 7:
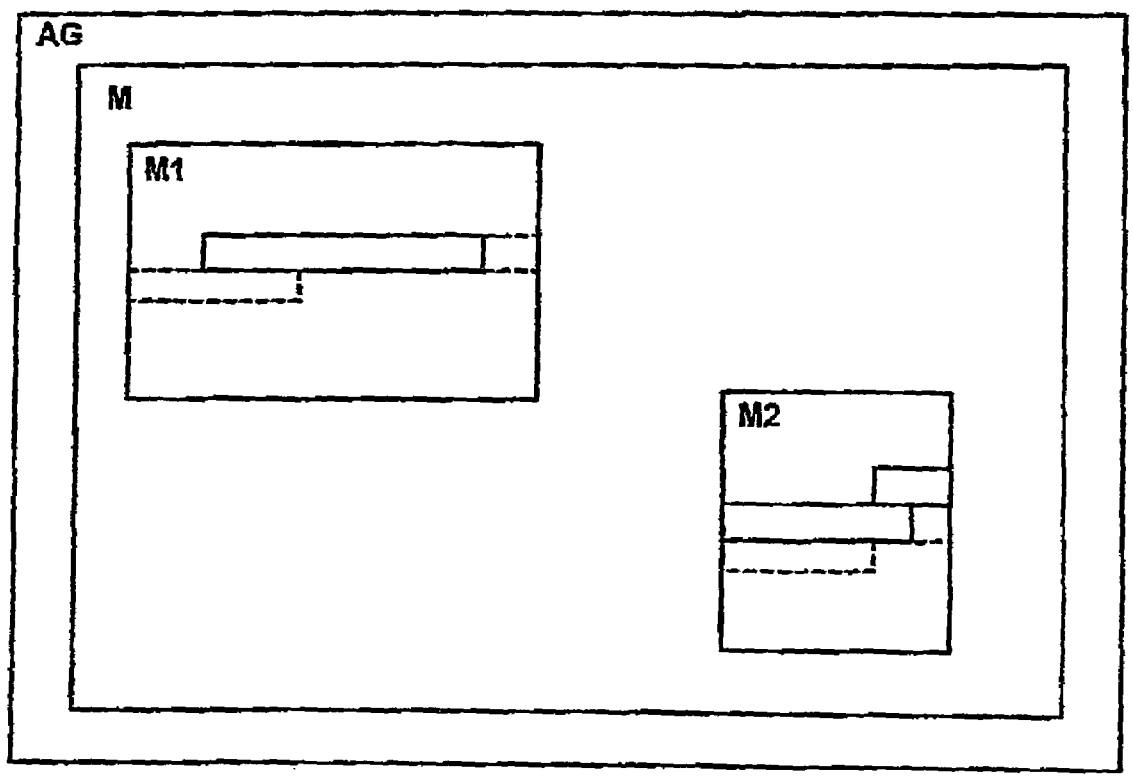
FIG. 7 is a block diagram of the memory layout of the memory of the programmable controller with drawn-out sections/segments which are accessed by certain tasks.

As can be seen from FIG. 7, a task T1, T2 does not access the entire memory M but only a section M1, M2 of the memory M of the programmable controller AG. The section M1, M2 accessed by the respective task T1, T2 is read out progressively by the respective allocated updating task T1A, T2A—in a manner comparable to the transfer of the basic data base in the first updating pass (indicated by the differently bordered areas in the respective section M1, M2) and transferred into the memory M' (not shown) of the back-up programmable controller AG'. During this process, additional position information is used which specifies the position of an area just read of a section M1, M2 referred to the memory M and which ensure that the content of the area just read is also written to corresponding addresses in the memory M'.

Even if the updating task T1A, T2A, in principle, progressively transfers the content of the part of the memory M1, M2 accessed by the respective task T1, T2, this progressive transfer occurs within a call of the updating task T1A, T2A. The program code of the updating task T1A, T2A can also provide for the transfer of the content of memory section M1, M2 to take place completely with one read process and one write process.

To enable the updating task T1A, T2A to transfer only the content of the part of the memory M1, M2 accessed by the respective task T1, T2, there are parameters for identifying the respective memory section M1, M2 within the updating task T1A, T2A—usually known as offset and magnitude or also as start and end address. These parameters can be allocated to respective values during the programming.

As an alternative, a method is also conceivable in which the accesses of each task T1, T2 of the memory M are logged in a log memory T1M, T2M and the updating task T1A, T2A transfers the part of the memory M1, M2 which is recognizable as to be transferred from the content of the respective log memory T1M, T2M. This avoids the requirement, which may be subject to errors, of having to specify the parameters for the memory section M1, M2 to be taken into consideration during the programming and also has the advantage that the updating task T1A, T2A does not need to transfer the entire content of the memory section M1, M2 but only the part which has actually been changed.

The diagrammatic representation of the log memory T1M, T2M in FIG. 6 illustrates that the log memory T1M, T2M is outside the memory M the content of which is to be transferred to the redundant programmable controller AG' especially since a transfer of the content of the log memory T1M, T2M is not required. The log memory T1M, T2M will be implemented as part of the memory M so that the separation between memory M and log memory T1M, T2M performed in FIG. 6 has only been done for the sake of clarity. The area of the memory M to be transferred is then specified by a start and end address or a start address and a data volume to be transferred starting at this start address. Memory contents not to be transferred such as, i.e. the contents of log memories T1M, T2M can then be located outside the area provided in this manner.

If during the second updating pass, none of the updating tasks T1A, T2A is terminated due to having exceeded the upper run time limit t1I, t2I, the updating is considered to be successfully concluded, subject to the transfer of the content of the special memory area accessed by the user program during the updating, which still has to be done. The content of the memory M' of the back-up programmable controller AG' corresponds to the content of the memory M of the programmable controller AG.

A signal from the programmable controller AG to the back-up programmable controller AG' can indicate to the latter that the updating has been successfully concluded. If then the copy of the user program is started in the back-up programmable controller AG' and the back-up programmable controller AG' carries out identical actions as the programmable controller AG' on the basis of the copy of the user program, the identity of the data continues to be ensured. Thus, the back-up programmable controller AG' can immediately take over the guidance of the technical process TP, e.g. should it be necessary to replace the programmable controller AG.

Transferring the contents of the respective memory sections M1, M2 by the updating tasks is found to be advantageous because a change in the contents of the memory sections is only possible during the run time of the respective tasks T1, T2 but not during the run time of the updating tasks T1A, T2A. The updating tasks T1A, T2A, therefore, can always completely transfer the contents of the respective memory sections M1, M2 so that, at the end of the updating task T1A, T2A, it is ensured that the content of the respective memory section M1, M2 has been transferred completely without changes in the content of this memory section, which may have taken place in the meantime, requiring a new transfer.

In the text which follows, a special case is described which is apparent from the previous statements, particularly in conjunction with FIG. 3. According to FIG. 3, the updating task T1A is called up twice—starting from time t+0 ms—and executed completely before updating task T2A is called up for the first time. Once the updating (essentially) is considered to be executed successfully when all updating tasks T1A, T2A could have been executed completely, the fact of the complete execution of the respective updating task T1A, T2A must be saved. In the configuration according to FIG. 3, a flag identifying the complete execution of the updating task T1A would be set for the updating task T1A, approximately at time t+125 ms. At time t+250 ms, a corresponding flag would be set for the updating tasks T2A. Since there are no further updating tasks T1A, T2A, the updating pass is thus considered to be ended successfully. The second updating pass is concluded approximately at time t+250 ms. Restarting of the updating tasks T1A, T2A is not required even if this is correspondingly shown in FIGS. 3, 4 and 5.

However, a configuration requiring special treatment only occurs if an updating task T1A, T2A is restarted after one complete pass before the second updating pass is ended. Such a configuration is shown in FIG. 5. At time t+125 ms, the updating task T1A has been processed and a corresponding flag would be set. At time t+250 ms the updating task T1A called up again is terminated since the predetermined upper run time limit t1I is exceeded because the second updating pass has not yet been concluded. At time t+275 ms, the corresponding flag is set for the updating task T2A then processed.

Here, too, both flags would be set, namely for updating tasks T1A from its first call and for updating tasks T2A from its only call, and the updating pass should thus be considered to be successfully concluded. In fact, however, updating task T1A was terminated before it could transfer the content of the entire section M1 of the memory M which is accessed by the associated task T1. Thus, not all changes in the memory section M1 may have been transferred so that the updating cannot considered to be concluded in such a configuration.

However, the required special treatment can be achieved simply by resetting the flag allocated to the respective updating task T1A, T2A with each new call of the task T1, T2 to which the respective updating task T1A, T2A is allocated. For the configuration described above, this means that the flag of updating task T1A is set at time t+125 ms and reset at time t+200 ms. Even if now the flag of updating task T2A is set at time t+275 ms, the updating is not considered to be concluded because the flag of updating task T1A is missing. In fact, the updating is only considered to be concluded at time t+375 ms, i.e. at the earliest time at which the flag of updating task T1A is set again for the first time but the flag of updating task T2A has not yet been reset again.

In the case where the log memory T1M, T2M is used in accordance with the advantageous embodiment of the invention already described above, the content of the respective log memory T1M, T2M must be reset after each complete execution of an updating task T1A, T2A or marked as invalid.

Another aspect of the invention deals with the situation in which a special task, an F task provided for special error processing or error responses, having a low priority, can no longer be executed within the actual fixed timing pattern provided due to the sum of run times of the updating tasks T1A, T2A since, due to the low priority of the F task, run-time tasks T1, T2 are executed with high priority and their associated updating tasks T1A, T2A are executed "preferentially".

According to this aspect, it is provided for such a configuration that the updating task T1A, T2A of a task T1, T2 with high priority, preferably updating task T1A of the task T1 having the highest priority, before it is executed itself, sets the priority of the F task for a short time to a value which results in its immediate execution, correspondingly displacing the updating task T1A. This ensures that even during the updating, the response characteristic of special low-priority F task remains predictable since their call is not delayed longer than tolerable due to the additional execution of the updating tasks T1A, T2A.

This provides a programmable controller with a task-oriented user program, the memory content of which is to be transferred to a redundant programmable controller without interruption of the operation. After a conventional transfer of a basic database, the transfer of data changed in the meantime is effected by updating tasks associated with the individual tasks, the updating tasks transferring only the section of the memory content which is accessed by the respective task.

The invention has been described in detail with particular reference to preferred embodiments thereof and examples, but it will be understood that variations and modifications can be effected within the spirit and scope of the invention.

The invention claimed is:

1. A programmable controller for at least one of controlling and monitoring a process, connected to a redundant programmable controller having a memory, said programmable controller comprising:

a memory to store at least one user program, having at least one task, and process related data and user-program-related data; a processor to execute said at least one task of the at least one user program and an updating task assigned thereto to transfer contents of a portion of said memory accessed by the at least one task into the memory of the redundant programmable controller and to terminate the updating task when a run time of the task and the updating task exceeds an upper run time limit; and a log memory, coupled to at least one of said memory and said processor, to log accesses of said memory by each task, wherein said processor executes the updating task to transfer the contents of the portion of said memory based on contents of said log memory logged for the task being updated, wherein the updating task is assigned a higher priority than the task to which the respective updating task is assigned, wherein if a cyclic updating task T1A, T2A, wherein T1A is a first updating task and T2A is a second updating task, is restarted after a complete transfer of memory contents before a second updating transfer of memory contents is ended, the processor calls up the first updating task T1A twice and executes the first updating task T1A completely before the second updating task T-2A is called up for a first time, and wherein, if an error task for selected error processing or error responses has a priority lower than run time tasks T1, T2 and cannot be executed within a fixed time that is less than a sum of run times of updating tasks T1A, T2A, the processor resets, for a predetermined period of time, the priority of the error task to a value which results in immediate execution of the error task, correspondingly displacing the updating task T1A.

2. A method for updating a redundant programmable controller, having a memory and communicatively connected to an operational programmable controller, during at least one of control and monitoring of a process by the operational programmable controller under control of at least one user program with at least one task, the operational programmable controller having a memory storing process-related data and user program-related data, said method comprising:

progressively transferring contents of the memory of the operational programmable controller into the memory of the redundant programmable controller in a first updating transfer of memory contents;

transferring into the memory of the redundant programmable controller using an updating task assigned to the at least one task in a second updating transfer of memory contents, the contents of a portion of the memory of the operational programmable controller accessed by the at least one task; and terminating the updating task when the run time of the task and the updating task exceeds an upper run time limit, wherein each access of the memory is logged and the updating task identifies the portion of the memory to be transferred based on what has been logged, wherein the updating task is assigned a higher priority than the task to which the respective updating task is assigned, wherein if a cyclic updating task T1A, T2A, wherein T1A is the first updating task and T2A is the second updating task, is restarted after the first updating transfer of memory contents before the second updating transfer of memory contents is ended calling up the first updating task T1A twice and executing the first updating task T1A completely before the second updating task T2A is called for a first time, and wherein, if an error task for selected error processing or error responses has a priority lower than run time tasks T1, T2 and cannot be executed within a fixed time that is less than a sum of run times of updating tasks T1A, T2A, resetting by the processor, for a predetermined period of time, the priority of the error task to a value which results in immediate execution of the error task, correspondingly displacing the updating task T1A.

3. The method as claimed in claim 2, wherein the second updating transfer of memory contents is restarted when the updating task has been terminated due to the upper run time limit being exceeded.

4. The method as claimed in claim 3, wherein the second updating transfer of memory contents is restarted after a predetermined or predeterminable relaxation time has elapsed.

* * * * *